United States Patent
Sato et al.

[11] Patent Number: 6,133,004
[45] Date of Patent: Oct. 17, 2000

[54] BIOREACTOR CARRIER GEL PREPARED FROM A CROSSLINKED N-VINYLCARBOXAMIDE RESIN

[75] Inventors: Takaya Sato; Tsutomu Uehara; Hiroshi Yoshida, all of Tokyo, Japan

[73] Assignee: Nisshinbo Industries, Inc., Tokyo, Japan

[21] Appl. No.: 09/036,900

[22] Filed: Mar. 9, 1998

[30] Foreign Application Priority Data

Mar. 14, 1997 [JP] Japan ..................... 9-061269

[51] Int. Cl.$^7$ ............ C12N 11/08; C12N 11/04; C12N 5/00; C02F 3/00; C12M 3/00
[52] U.S. Cl. ............ 435/180; 210/601; 435/182; 435/395; 435/396; 435/397; 435/262.5; 435/289.1
[58] Field of Search ............ 435/174, 180, 435/182, 395, 396, 397, 289.1, 262.5; 210/601

[56] References Cited

U.S. PATENT DOCUMENTS 4,607,057  8/1986  Bonnans et al. ............ 521/52

FOREIGN PATENT DOCUMENTS 0 473 881 A1  3/1992  European Pat. Off. .
WO96/02581   2/1996  WIPO .

OTHER PUBLICATIONS

Chemical Abstract, vol. 124, No. 24; Jun. 10, 1996 Abstract No. 318213r.
Patent Abstracts of Japan, vol. 096, No. 011, Nov. 29, 1996.

*Primary Examiner*—David M. Naff
*Attorney, Agent, or Firm*—Jones & Askew, LLP

[57] ABSTRACT

A bioreactor carrier is provided composed of a water absorption gel of a crosslinked N-vinylcarboxamide resin which has a great moisture content and excellent physical strength, is not eroded by microorganisms and is easily mass-produced on an industrial scale. The gel is obtained by swelling and gelling a crosslinked N-vinylcarboxamide resin made from an N-vinylcarboxamide such as N-vinylacetoamide. The swollen gel may be in the form of beads of 1.0 to 20 mm, and the resin when swollen with water has a water absorption coefficient of 500 to 3500%. Resin beads may be swollen in a suspension of a biocatalyst such as animal cells, plant cells, microorganisms or protozoans to bind and immobilize the biocatalyst to form a bioreactor. The microorganisms can be nitrate bacteria, denitrification bacteria or Hyphomycetes, and the bioreactor may be used to treat waste water or for deodorizing. The crosslinked N-vinylcarboxamide resin contains a repeating unit shown by formula (A) below crosslinked with a crosslinking agent.

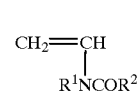

(A)

wherein $R^1$ and $R^2$ represent independently a hydrogen atom or a methyl group.

8 Claims, 1 Drawing Sheet

BIOREACTOR CARRIER GEL PREPARED FROM A CROSSLINKED N-VINYLCARBOXAMIDE RESIN

BACKGROUND OF THE INVENTION

The present invention relates to a water absorption gel carrier which binds and immobilizes a biocatalyst such as an animal or plant cell, microorganism or protozoan and is used as a bioreactor (immobilized biocatalyst) for the production of a substance, a treatment for making a harmful substance harmless, the treatment of waste oil, the treatment of waste water, deodorization and the like, to a resin bead for a bioreactor water absorption gel carrier and to a bioreactor using the same.

Carriers used in bioreactors are roughly divided into porous carriers and gel carriers (non-porous). The porous carriers include polyurethane porous bodies, cellulose porous bodies, polypropylene porous bodies, polyvinyl formal porous bodies, ceramic porous bodies and the like.

These carriers have a large surface area because they are porous and are used with animal or plant cells, microorganisms and protozoans bound and immobilized to the surfaces of their pores in many cases.

However, since polyurethane and polypropylene porous bodies are hydrophobic, they are inferior in flowability in water and difficult to bind a biocatalyst such as an animal or plant cell, microorganism or protozoan. Cellulose porous bodies have a short service life because they are eroded by microorganisms. Polyvinyl formal porous bodies have such a defect that their industrial production processes have not been established yet. Ceramics cannot be circulated in water because of their high specific gravities and hence, their usages are limited.

Gel carriers include polyacrylamide gel carrier, polyethylene glycol gel carrier, polyvinyl alcohol gel carrier, alginic acid gel carrier and the like. These gel carriers are generally used with animal or plant cells, microorganisms, protozoans or the like inclusively immobilized in gel. They can also be used with animal or plant cells, microorganisms, protozoans or the like bound and immobilized to the surfaces of their gels.

Although these gel carriers have a high moisture content, they have high affinity for living organisms excluding polyacrylamide gel carriers synthesized from acrylamides having cytotoxicity, and provide an ideal living environment for animal and plant cells, microorganisms and protozoans. On the other hand, most of them are inferior in physical strength because of their high moisture content and very likely to be worn out or decay in a reaction tank of a waste water treatment system or the like during use.

Gel carriers so far reported, including the above carriers, fall under the category of thermally curable, low-temperature curable, ion crosslinkable and photocurable organic polymer compounds and are obtained by gelling a reactive monomer dissolved in water through a reaction.

These carriers must be formed cubic, spherical or disk-like with a diameter of several millimeters to obtain a large surface area. The most commonly used conventional means for attaining this include one in which a water containing and swollen gel is cut, one in which an aqueous solution of a monomer is gelled into a spherical form having a diameter of several millimeters through a reaction, and the like. As a result, the conventional processes for producing gel carriers are very complicated, take a long time and cost dear. Further, it is difficult to produce a large quantity of a gel. For these reasons, it is considered that a bioreactor using a gel carrier is hardly widespread.

SUMMARY OF THE INVENTION

It is an object of the present invention to provide a carrier for bioreactor which is composed of a water absorption gel of a crosslinkable N-vinylcarboxamide resin which has a great moisture content and excellent physical strength, is not eroded by microorganisms, and is easily mass-produced on an industrial scale, a crosslinkable N-vinylcarboxamide resin bead for the carrier for bioreactor, and a bioreactor using the same.

The inventors of the present invention have conducted intensive studies to achieve the above object and have reached the following invention.

That is, the present invention provides a carrier for bioreactor which is composed of a water absorption gel obtained by swelling and gelling a crosslinkable N-vinylcarboxamide resin synthesized from an N-vinylcarboxamide represented by the following general formula (A) through water absorption and having a water absorption coefficient of 50 to 3,500%.

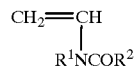

(A)

wherein $R^1$ and $R^2$ represent independently a hydrogen atom or a methyl group.

The present invention also provides a resin bead for a carrier for bioreactor which is composed of a crosslinkable N-vinylcarboxamide resin which is synthesized from an N-vinylcarboxamide represented by the above general formula (A) and can be swollen and gelled through water absorption and which has a water absorption coefficient of 50 to 3,500% when swollen with water.

The present invention further provides a bioreactor obtained by swelling and gelling the resin bead with a suspension of a biocatalyst.

Although the carrier for bioreactor which is composed of a water absorption gel of a crosslinkable N-vinylcarboxamide resin according to the present invention has a high moisture content, it adsorbs animal and plant cells, microorganisms and protozoans without reducing their physiological activities and is rarely eroded by microorganisms due to its high abrasion strength and hydrophilic nature.

The crosslinkable N-vinylcarboxamide resin bead for a water absorption gel carrier for a bioreactor according to the present invention is a dry resin particle which can form a water absorption gel by absorbing a great amount of water and is advantageous in transportation and storage. The resin bead has stable gelation ability in a salt solution or organic solvent at a wide pH range and a wide temperature range.

Further, when the carrier for bioreactor composed of a water absorption gel of a crosslinkable N-vinylcarboxamide resin according to the present invention (may be referred to as "water absorption gel carrier" hereinafter) or the bioreactor of the present invention using the crosslinkable N-vinylcarboxamide resin bead of the present invention is used, the agitation efficiency of a reaction tank of a waste water treating system or the like and the densities of animal or plant cells, microorganisms or protozoans can be improved and a high treatment capacity can be attained.

Figure 1:
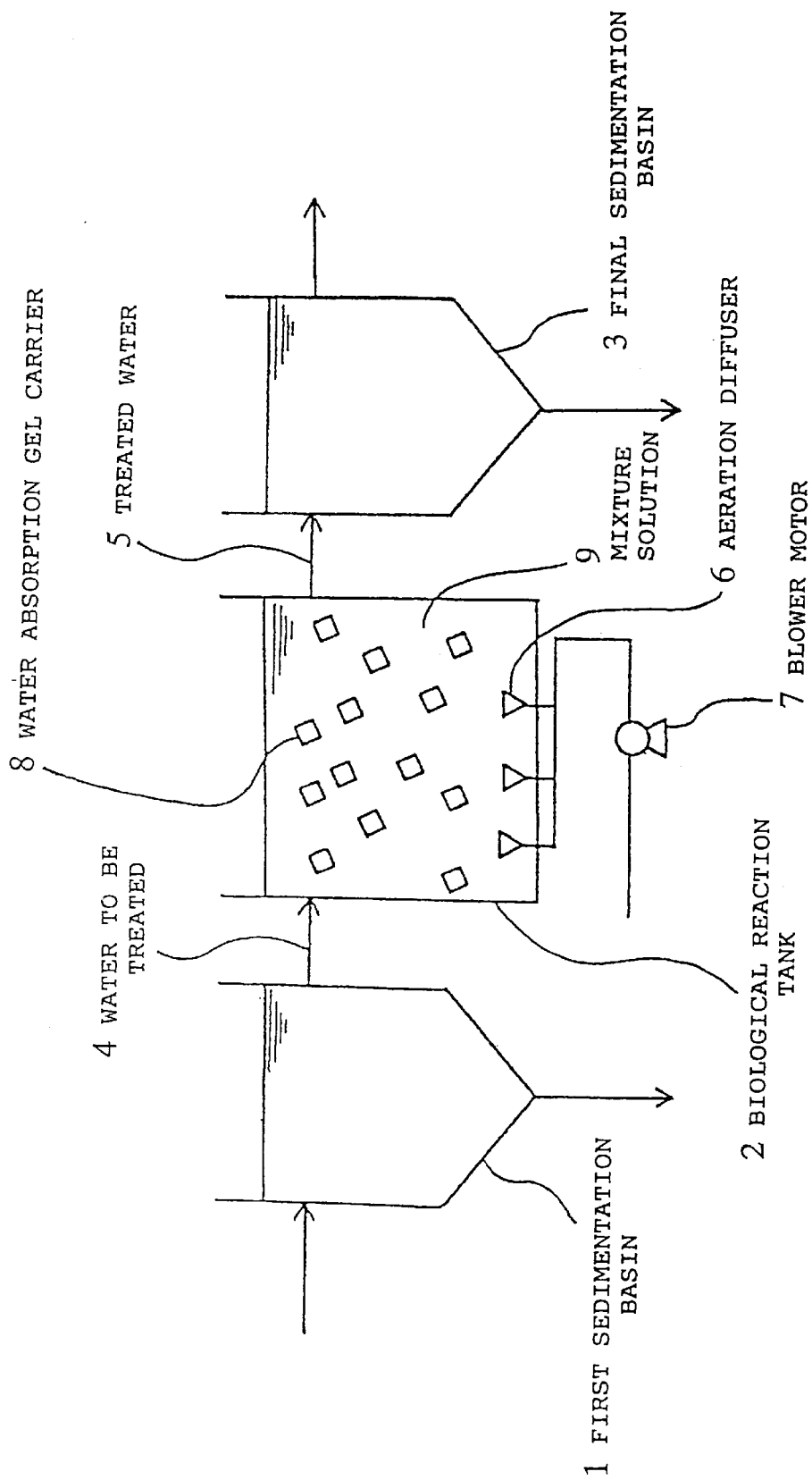
FIG. 1 is a schematic diagram of a waste water treatment system which uses the crosslinkable N-vinylcarboxamide water absorption gel carrier of the present invention.

DETAILED DESCRIPTION OF THE INVENTION (1) Crosslinkable N-vinylcarboxamide resin bead of the present invention A crosslinkable N-vinylcarboxamide resin forming the crosslinkable N-vinylcarboxamide resin bead of the present invention is synthesized from an N-vinylcarboxamide represented by the following general formula (A) as a raw material and has a water absorption coefficient of 50 to 3,500% when it is swollen with water.

wherein $R^1$ and $R^2$ represent independently a hydrogen atom or a methyl group.

The term "water absorption coefficient" used herein is defined by the following equation (I).

Water absorption coefficient(%)=100×(Weight when completely swollen in water(g)−Weight when absolutely dried(g))/Weight when absolutely dried(g)   (I)

In the above equation (I), the weight when completely swollen is a weight when the resin is immersed in purified water at 25° C. and there is no weight change any longer and the weight when absolutely dried is a weight when the resin is dried at 100° C. and there is no weight reduction any longer.

In the present invention, a crosslinkable N-vinylcarboxamide resin having a water absorption coefficient of 50 to 3,500% when it is swollen with water is used. The water absorption coefficient of the resin is more preferably 500 to 3,000%.

If the water absorption coefficient is smaller than 50%, it is hardly to say that the crosslinkable N-vinylcarboxamide resin has water absorption properties, microorganisms are hardly adhered to the obtained water absorption gel, and the flowability in water of the water absorption gel deteriorates due to its increased specific gravity. If the water absorption coefficient is larger than 3,500%, the physical strength of the obtained water absorption gel greatly lowers which is not practical.

The crosslinkable N-vinylcarboxamide resin having the above properties as used in the present invention is obtained by crosslinking, for example, the main chain of an N-vinylcarboxamide resin such as a homopolymer obtained by polymerizing the above N-vinylcarboxamide or a copolymer obtained by copolymerizing the N-vinylcarboxamide and other vinyl monomer.

(i) N-vinylcarboxamide resin

The main constituent monomer component of the N-vinylcarboxamide resin is an N-vinylcarboxamide represented by the above general formula (A). Typical examples of the N-vinylcarboxamide include N-vinylformamide, N-vinylacetoamide, N-methyl-N-vinylformamide and N-methyl-N-vinylacetoamide. Out of these, N-vinylacetoamide is particularly preferred.

When the N-vinylcarboxamide resin is a copolymer obtained by copolymerizing an N-vinylcarboxamide and other vinyl monomer, the other vinyl monomer constituting the copolymer is selected from the group consisting of acrylic acid, methacrylic acid and alkali metal salts thereof such as sodium salts and potassium salts thereof; alkyl esters such as methyl ester, ethyl ester, propyl ester, dodecyl ester, stearyl ester and palmityl ester; hydroxy lower alkyl esters such as hydroxyethyl ester and hydroxypropyl ester; lower alkyl esters substituted by lower alkyl amino groups such as dimethylaminomethyl ester and dimethylaminoethyl ester; lower alkyl esters substituted by quaternary amino groups such as halogenated trimethylaminoethyl ester and halogenated triethylaminoethyl ester; amides substituted by lower alkyl amino groups such as dimethylaminomethylamide and diethylaminoethylamide; lower alkyl amides substituted by quaternary amino groups such as halogenated trimethylaminoethylamide and halogenated triethylaminoethylamide; lower alkyl amides substituted by sulfonic acid or alkali metal sulfonic acid such as sulfomethylamide, sulfoethylamide and sodium sulfoethylamide; lower carboxylic acid vinyls such as acrylonitrile, N-vinyl-2-pyrrolidone, vinyl acetate and vinyl propionate; allylsulfonic acid, maleic acid, fumaric acid, itaconic acid and alkali metal salts thereof; and the like.

Particularly, when a crosslinkable N-vinylcarboxamide resin is used in a bioreactor and an anion exchange group is introduced into the crosslinkable N-vinylcarboxamide resin to efficiently adhere or adsorb microorganisms usually charged negatively to a water absorption gel carrier, the carrier can be charged positively by selecting a lower alkyl ester substituted by a quaternary amino group such as a halogenated triethylaminoethyl ester of acrylic acid or methacrylic acid or a lower alkyl amide substituted by a quaternary amino group such as halogenated triethylaminoethylamide to generate cations by dissociating the anion exchange group in water.

(ii) Crosslinking agent

A crosslinking agent used for the synthesis of the crosslinkable N-vinylcarboxamide resin of the present invention is a compound having at least two polymerizable unsaturated groups in one molecule. Typical examples of the crosslinking agent include N,N'-lower alkylenebisacrylamides such as N,N'-methylenebisacrylamide and N,N'-ethylenebisacrylamide; alkyleneglycoldi(meth)acrylate; divinyl compounds such as divinylbenzene and divinylether; polyallyl compounds such as trimethylolpropane diallyl ether and pentaerythritol triallyl ether; N,N'-lower alkylenebis(N-vinylcarboxamide) such as N,N'-methylenebis(N-vinylacetoamide), N,N'-propylenebis(N-vinylacetoamide) and N,N'-butylenebis(N-vinylacetoamide); and the like.

The amount of the crosslinking agent used for the synthesis of the crosslinkable N-vinylcarboxamide resin of the present invention is suitably selected according to the proportion of the N-vinylcarboxamide in the main chain, the desired water absorption coefficient of the resin, the desired physical strength of the resin when it absorbs water and the like. However, if the water absorption coefficient of the obtained resin is set within the above required range in the present invention, other properties of the resin are not particularly limited.

(iii) Synthesis of crosslinkable N-vinylcarboxamide resin

The synthesis of the crosslinkable N-vinylcarboxamide resin of the present invention is carried out by precipitation copolymerizing a monomer constituting the above-described N-vinylcarboxamide resin and a crosslinking agent in a non-aqueous solvent for uniformly dissolving these using a polymerization initiator described below and evaporating and drying the solvent.

The polymerization initiator used in the synthesis is a peroxide, organic peroxide, azobis-based compound or the like which is dissolved in a solvent used in a polymerization reaction, as exemplified by benzoyl peroxide, t-butyl hydroperoxide and 2,2'-azobis(isobutyronitrile) and the like. The amount of the polymerization initiator used is suitably selected according to the desired particle diameter, water absorption coefficient and physical strength when absorbing water of the obtained resin. However, if the water absorption coefficient of the obtained resin is set within the above required range in the present invention, other properties of the resin are not particularly limited.

(iv) Crosslinkable N-vinylcarboxamide resin bead of the present invention

The crosslinkable N-vinylcarboxamide resin bead of the present invention is a particulate resin bead composed of the crosslinkable N-vinylcarboxamide resin obtained as described above. The crosslinkable N-vinylcarboxamide resin may be obtained in a particulate form in (iii) above. In this case, it can be directly used as the resin bead of the present invention. When the crosslinkable N-vinylcarboxamide resin is not obtained in a particulate form in (iii) above, a particulate resin bead can be obtained by milling after polymerization and drying.

The particle diameter of the thus obtained crosslinkable N-vinylcarboxamide resin bead of the present invention is preferably 1.0 mm to 20 mm, more preferably 3.0 to 10 mm, when it is completely swollen with water. If the particle diameter is smaller than 1.0 mm, the beads are apt to run out disadvantageously from a reaction tank such as a biological treatment tank when they are formed into bioreactors. If the particle diameter is larger than 20 mm, the surface area per volume of the bead becomes small. As a result, the amount of the beads to be charged into the reaction tank such as a biological treatment tank increase disadvantageously when they are formed into bioreactors.

The control of the particle diameter of the above resin bead can be carried out by precipitation copolymerization to ensure that the particle diameter should fall within the above range while the obtained resin particles are completely swollen with water at the time of polymerizing the crosslinkable N-vinylcarboxamide resin, or by milling the resin so that the particle diameter thereof when it is completely swollen with water should fall within the above range after the resin is polymerized and dried. Further, to ensure that the particle diameter of the resin when it is completely swollen with water should fall within the above range, a sieve of a suitably selected size is used to screen resin particles to prepare resin beads having the controlled particle diameter.

The crosslinkable N-vinylcarboxamide resin bead of the present invention is a dried particulate resin bead and can be formed into a carrier for bioreactor by swelling and gelling the resin bead with water or a bioreactor by swelling and gelling it with a suspension of animal or plant cells, microorganisms or the like, at the time of use. Therefore, compared with a conventional gel carrier which is obtained in a hydrous state, the resin bead of the present invention is very advantageous in transportation and storage.

(2) Carrier for bioreactor of the present invention

The carrier for bioreactor of the present invention is composed of a water absorption gel obtained by swelling and gelling the crosslinkable N-vinylcarboxamide resin obtained by the above method through water absorption.

The water absorption coefficient of the water absorption gel constituting the carrier for bioreactor of the present invention when it is swollen with water is in the range of 50 to 3,500%, preferably 500 to 3,000%.

The particle diameter of the water absorption gel constituting the carrier for bioreactor of the present invention is preferably in the range of 1.0 to 20 mm, more preferably 3.0 to 10 mm, when it is completely swollen with water. The reason for setting the particle diameter of the water absorption gel to the above range is described above. To obtain the water absorption gel having a particle diameter within the above range, the above crosslinkable N-vinylcarboxamide resin bead having a controlled particle diameter may be swollen and gelled through water absorption. Alternatively, when the crosslinkable N-vinylcarboxamide resin beads having a non-controlled particle diameter are used, water absorption gels obtained by swelling and gelling the resin beads are put through a sieve to obtain water absorption gels having the controlled particle diameter.

(3) Bioreactor (immobilized biocatalyst) and biocatalyst reaction using the same The bioreactor of the present invention is obtained by adhering biocatalysts to the surface of the water absorption gel of the crosslinkable N-vinylcarboxamide resin having a water absorption coefficient of 50 to 3,500% when it is swollen with water to immobilize it.

The biocatalysts used in the above bioreactor include animal and plant cells, microorganisms, protozoans and the like. Illustrative examples of the microorganism include nitrate bacteria, denitrification bacteria, Hyphomycetes and the like, and illustrative examples of the protozoan include Oligochaeta, rotifier, Vorticella and the like. The crosslinkable N-vinylcarboxamide resin bead or carrier for bioreactor of the present invention is preferably used in a bioreactor using a waste water treating catalyst or deodorizing catalyst as the biocatalyst.

The carrier for bioreactor of the present invention is composed of a water absorption gel of the above crosslinkable N-vinylcarboxamide resin and has excellent affinity for a biocatalyst such as an animal or plant cell, microorganism or protozoan and can adhere these biocatalysts to the surface of the water absorption gel with ease because the raw material N-vinylcarboxamide resin has extremely high hydrophilic nature and the property of containing a large amount of water in a gel.

The water absorption gel of the above crosslinkable N-vinylcarboxamide resin does not have a porous structure which can be observed with the naked eye unlike a sponge-like porous carrier. Therefore, only very sticky biocatalysts such as nitrate bacteria, denitrification bacteria and Hyphomycetes are preferentially adhered to the surface of the above water absorption gel carrier. When biocatalysts having low stickiness are scraped off from the surface of the water absorption gel by stirring or the like, only very sticky biocatalysts are adhered in large quantities. Thus, a bioreactor to which only very sticky biocatalysts are bound and immobilized in large quantities can be obtained.

When the thus obtained bioreactor is placed in a reaction tank or the like to carry out a biocatalyst reaction, the desorption of the biocatalysts from the bioreactor by stirring, floating or the like hardly occurs, and further only the very sticky biocatalysts adhered to the surface of the carrier can be multiplied thereon. This is a considerable point of the bioreactor of the present invention.

Since the N-vinylcarboxamide resin is a nonionic polymer, it has a stable water absorption and retaining effect at a wider pH range and a wider temperature range than the polymer used in the conventional gel carrier. This effect is exhibited even in a salt solution such as a culture solution or sea water, or an organic solvent such as an alcohol.

Further, as the N-vinylcarboxamide resin has high shearing resistance in the form of a water absorption gel unlike the conventional hydrous gel, efficient stirring with a propeller or the like is possible even biocatalysts such as animal and plant cells, microorganisms and protozoans are immobilized to the outer surface of the water absorption gel carrier in large quantities at a high density.

The bioreactor of the present invention can be obtained, for example, by swelling and gelling the crosslinkable N-vinylcarboxamide resin bead of the present invention with a suspension of biocatalysts, or by immersing the carrier for bioreactor of the present invention in the suspension of biocatalysts.

The biocatalysts used in the above methods are enumerated above. A suspending medium for the suspension of the biocatalysts is not particularly limited. For example, the same suspending medium as that generally used to suspend biocatalysts can be used. The concentration of the biocatalysts in the suspension is not particularly limited. The former method for swelling and gelling the resin bead is not particularly limited and may be, for example, a method in which the resin bead is immersed in a sufficient amount of a suspension of biocatalysts for a time period sufficient to swell and gel the resin bead.

When a bioreactor obtained by swelling and gelling the above resin bead with a suspension of biocatalysts is used out of these bioreactors thus obtained, the initial performance of the bioreactor can be greatly improved advantageously.

According to a production process using a crosslinkable N-vinylcarboxamide resin bead, as the resin bead is a dried particular resin bead, a bioreactor can be formed from the resin bead by swelling and gelling it with a suspension of animal or plant cells, microorganisms or the like at the time of using the bioreactor. Therefore, it is very advantageous in transportation and storage compared with the conventional gel carrier obtained in a hydrous state.

The bioreactor of the present invention can be used to carry out a biocatalyst reaction like an ordinary bioreactor.

The method for carrying out a biocatalyst reaction may comprise, for example, the steps of placing the bioreactor of the present invention in a reaction tank containing the substrates that the biocatalysts immobilized to the bioreactor can act on, and carrying out the reaction for an appropriate time period under appropriate conditions that the biocatalysts can act on the substrates. The reaction conditions such as the concentration of the substrates, temperature, pH, aeration and stirring, and the reaction method such as batch or continuous reaction method can be suitably selected according to the biocatalysts used, the substrates for the biocatalysts, the purpose of the reaction and the like.

In the present invention, a mixture is obtained by introducing the water absorption gel carrier for bioreactor of the present invention, biocatalysts and a substrate-containing solution into a reaction tank or the like at the same time and placed under appropriate conditions that the biocatalysts can act on the substrates in the reaction tank or the like, thereby making it possible to carry out the immobilization of the biocatalysts to the carrier, that is, the production of a bioreactor, simultaneously with the reaction of the substrates with the biocatalysts.

Stated more specifically, the water absorption gel carrier of the present invention is placed in a culture solution or water to be treated containing biocatalysts such as animal and plant cells, microorganisms and protozoans and substrates. Since this carrier has extremely high affinity for living organisms, animal and plant cells, microorganisms and protozoans contained in water are adhered to the surface of the gel, and multiply on the surface with the substrates contained in the culture solution or water to be treated as nutriments to form a bioreactor. Simultaneously with this, in the culture solution or water to be treated, the substrates contained in the culture solution or water to be treated cause a biocatalyst reaction such as decomposition or synthesis due to the actions of both the biocatalysts immobilized to the bioreactor and floating biocatalysts.

In the formation of the bioreactor, very sticky biocatalysts such as nitrate bacteria, denitrification bacteria and Hyphomycetes are preferentially adhered to the surface of the water absorption gel carrier as the water absorption gel carrier of the present invention does not have a porous structure which can be observed with the naked eye unlike a sponge-like porous carrier.

In other words, when the culture solution or water to be treated containing the water absorption gel carriers is stirred by aeration agitation or with an agitator, biocatalysts such as animal and plant cells, microorganisms and protozoans having low stickiness to the carrier fall off from the surface of the water absorption gel carriers. However, since biocatalysts such as animal and plant cells, microorganisms and protozoans having high stickiness to the carrier hardly fall off even when they flow, only these biocatalysts adhere, bind and immobilize to the surface of the carrier in large quantities to form a bioreactor. Therefore, out of microorganisms, only very sticky animal and plant cells, microorganisms and protozoans are multiplied on the surface of the carrier.

In the above reaction system, the water absorption gel carrier of the present invention can be stirred efficiently with a propeller or the like in the form of a bioreactor in which biocatalysts such as animal and plant cells, microorganisms and protozoans are immobilized to the exterior surface of the carrier in large quantities at a high density due to its high shearing resistance unlike the conventional hydrous gel, whereby a biocatalyst reaction in the above culture solution or water to be treated can be promoted.

Waste water treatment using the water absorption gel carrier of the present invention, particularly the decomposition treatment of nitrogen in the form of ammonia contained in waste water into nitrogen in the form of nitric acid will be described hereinunder as an example.

FIG. 1 is a schematic diagram of a waste water treatment system using the water absorption gel carrier of the present invention. In FIG. 1, reference numeral 1 denotes a first sedimentation basin or raw water tank, 2 a biological reaction tank, and 3 a final sedimentation basin or sedimentation tank. Water 4 to be treated supplied from the first sedimentation basin 1 is treated biologically in the biological reaction tank 2. The treated water 5 is supplied to the final sedimentation basin 3 which is designed to remove precipitates and discharge supernatant water.

An aeration diffuser 6 for supplying air whose oxygen or oxygen concentration is suitably adjusted is installed in the biological reaction tank 2. Air containing oxygen is supplied to the diffuser 6 from a blower motor 7.

The water absorption gel carrier 8 of the present invention is injected into the biological reaction tank 2. In the biological reaction tank 2, when air containing oxygen is blown out from the diffuser 6 while the water 4 to be treated is introduced and the treated water 5 in the tank is supplied to the final sedimentation basin 3, oxygen is supplied into a mixture solution 9 in the tank. At this point, an upward current of air bubbles is generated, a convection current of the mixture solution is produced, and the water absorption gel carrier floats and circulates in the reaction tank. Microorganisms and the like for decomposing and removing organic polluting substances contained in the mixture solution 9 are adhered, bound and immobilized to the water absorption gel carrier 8 and a bioreactor is thus obtained.

At this point, the water absorption gel carrier 8 has an extremely high water absorption coefficient and high affinity for microorganisms and the like. The mixture solution contains floating microorganisms. The microorganisms include various kinds of microorganisms such as BOD metabolizing bacteria which feed organic polluting substances as nutriments, nitrate bacteria which decompose nitrogen in the form of ammonia into nitrogen in the form of nitric acid, denitrification bacteria which changes nitrogen in the form of nitric acid into gaseous nitrogen and the like.

Since these microorganisms look like grains of sludge in water, they may be generically called active sludge. Further, the active sludge may include protozoans such as Oligochaeta, rotifier, Vorticella and the like.

Out of these floating microorganisms, very sticky microorganisms, for example, nitrate bacteria and the like are bound and immobilized to the surface of the water absorption gel carrier positively. In the biological reaction tank 2, organic polluting substances and nitrogen components contained in the water to be treated are decomposed and removed by the actions of both microorganisms bound and immobilized to the surface of the carrier and floating microorganisms.

It has been found that nitrogen in the form of ammonia contained in waste water is one of the major causes of river pollution and ocean pollution. Nitrogen in the form of ammonia contained in waste water is desired to be reduced. Nitrogen in the form of ammonia contained in waste water is changed into nitric acid by nitrate bacteria contained in active sludge and nitric acid is changed into gaseous nitrogen by denitrification bacteria and discharged into the air.

Since nitrate bacteria are extremely slow growing bacteria, the concentration of nitrate bacteria contained in floating microorganisms, that is, active sludge is not so high. Therefore, nitrogen in the form of ammonia cannot be sufficiently treated by an active sludge method which is generally used for waste water treatment.

Why cannot nitrate bacteria multiply in the active sludge? The inventors of the present invention have studied and have reached the following conclusion.

That is, it is considered that the total number of microorganisms which can be contained in a unit space is almost fixed. Therefore, when fast growing bacteria such as BOD metabolizing bacteria are contained in the active sludge, the number of only BOD metabolizing bacteria increases and slow growing bacteria such as nitrate bacteria cannot grow. As a result, the concentration of nitrate bacteria contained in the active sludge is always low. To eliminate this, only nitrate bacteria should be multiplied in a different space. Since nitrate bacteria are very sticky, they can adhere to the smooth surface of the water absorption gel carrier. On the other hand, microorganisms such as not so sticky BOD metabolizing bacteria cannot adhere to the surface of the carrier. Therefore, only nitrate bacteria multiply in the space of the surface of the carrier in a high concentration.

Use of the water absorption gel carrier of the present invention means the separation of a living space for nitrate bacteria from a living space for BOD metabolizing bacteria. Nitrogen in the form of ammonia is treated by nitrate bacteria bound to the surface of the water absorption gel carrier biologically very efficiently at a high speed.

Meanwhile, when a porous carrier is used, sludge is caught in air holes in the sponge-like carrier and the concentration of the sludge in the biological reaction tank is increased to improve the treatment capacity of waste water. Therefore, the effect of separating living spaces as the present inventors state is small. Accordingly, the porous carrier has a smaller capacity of treating nitrogen in the form of ammonia than the water absorption gel carrier in many cases.

Waste water treatment, particularly, the decomposition of nitrogen in the form of ammonia contained in waste water into nitrogen in the form of nitric aid has been described above. The water absorption gel carrier of the present invention is not limited to the above example and can be used for other waste water treatment such as denitrification process and biocatalyst reaction other than waste water treatment, such as deodorization of organisms, as a waste water treating catalyst, a deodorizing catalyst and the like.

EXAMPLE

The following examples are provided for the purpose of further illustrating the present invention but are in no way to be taken as limiting.

Example 1

Preparation of Crosslinkable N-Vinylacetoamide Gel Carrier

A crosslinkable N-vinylacetoamide resin having a water absorption coefficient of 2,800% (manufactured by Showa Denko k.k.) was put through a sieve, and resin beads having a particle diameter of 1.0 to 2.0 mm were collected and immersed in deionized water at room temperature for 24 hours to produce crosslinkable N-vinylacetoamide resin water absorption gel carriers having a particle diameter of 3.0 to 6.0 mm.

Example 2

Production of Bioreactor Using Crosslinkable N-Vinylacetoamide Resin Bead

A crosslinkable N-vinylacetoamide resin having a water absorption coefficient of 2,800% (manufactured by Showa Denko k.k.) was put through a sieve, and resin beads having a particle diameter of 1.0 to 2.0 mm were collected and immersed in 5,000 mg/l measured by MLSS of a sludge suspension in a nitrification tank and stirred by air with an air pump at 25° C. for 24 hours to produce bioreactors using crosslinkable N-vinylacetoamide resin water absorption gel carriers having a particle diameter of 3.0 to 6.0 mm.

Comparative Example 1

Production of Bioreactor Using Polyethylene Glycol Gel Carrier 10 parts by weight of polyethylene glycol monomethacrylate (M-230G manufactured by Shin Nakamura Kagaku Kogyo Co.), 5 parts by weight of polyethylene glycol dimethacrylate (23G manufactured by Shin Nakamura Kagaku Kogyo Co.) and 0.4 part by weight of dimethylaminopropionitrile were dissolved in 34.4 parts by weight of water. A solution of 0.6 part by weight of potassium persulfate dissolved in 49.4 parts by weight of a sludge suspension in a nitrification tank having a concentration measured by MLSS of 5,000 mg/l was added to the resulting solution and stirred well. The resulting solution was poured into a mold and gelled. The gel was taken out from the mold and cut into a 5 mm square cube to produce a bioreactor using a polyethylene glycol gel carrier. This gel carrier had a water absorption coefficient of 570%.

Example 3

Nitrification Test for Short-Term Waste Water Treatment

The gel carrier obtained in Example 1 and two different bioreactors obtained in Example 2 and Comparative Example 1 were used to carry out a nitrification test for short-term waste water treatment. A waste water treatment apparatus shown in FIG. 1 was used as a test apparatus. 2 L of carrier or bioreactor and nitrification tank sludge 5g-SS for the gel carrier of Example 1 were added to a 20-liter aeration tank (biological reaction tank) 2 and artificial waste water shown in Table 1 was used to carry out the test under conditions shown in Table 2.

TABLE 1

|  | concentration (mg/L) |
|---|---|
| $NH_4Cl$ | 191.5 |
| $Na_2HPO_4.12H_2O$ | 31.3 |
| $MgSO_4.7H_2O$ | 4.3 |
| $CaCl_2.2H_2O$ | 3.3 |
| KCl | 2.7 |
| $NH_4$—N | 50 |

TABLE 2

| HRT | 8 hours |
|---|---|
| return sludge | 1/20 of inflow of raw water |
| temperature | 25° C. |
| pH | 6.0–7.0 |
| DO | 4.0 |
| tank load | 0.15 kg - $N/m^3 \cdot d$ |

The $NH_4$—N concentrations of the raw water and the treated water were measured 2 weeks and 4 weeks after the addition of the gel carrier or bioreactor to obtain the removal rate of $NH_4$—N. A nitrification bacteria adhesion test to be described hereinafter was made on the carrier or bioreactor after a 4-week test. The results are shown in Table 3.

Example 4

Nitrification Bacteria Adhesion Test

After the nitrification test for waste water treatment shown in Example 3 was carried out for 4 weeks, 50 gel carriers or bioreactors were taken out from the aeration tank, placed as a specimen in a 50 ml measuring flask which was then filled up with purified water. After each measuring flask was placed in an ultrasonic washing machine to separate microorganisms from the specimen, the number of nitrite bacteria and the number of nitrate bacteria contained in the suspension of microorganisms in the measuring flask were counted using a nitrification bacteria measuring kit ("Kenshutsu-kun" manufactured by Yakult Co.), and the sum of both numbers was found out as the total number of nitrification bacteria to obtain the quantity of nitrification bacteria adhered. The results are shown in Table 3. It is obvious from the results that biocatalysts were adhered to the surface of the gel carrier of Example 1 during the test and formed a bioreactor after 4 weeks of the test.

Example 5

Gel Carrier Abrasion Test

The following abrasion test was made on the gel carrier obtained in Example 1 and the two bioreactors obtained in Example 2 and Comparative Example 1. That is, 30 ml (measured using a 100 ml measuring cylinder) of the gel carrier or bioreactor and 120 ml of water were added to a container composed of a glass bottle (diameter of 40 mm and length of 200 mm) for comparing the abrasion strength of a carrier or bioreactor, whose inner surface has water-proof sand paper (No. 100) affixed thereto and the container was stoppered. The container was shaken back and forth at a stroke of 70 mm and a revolution of 150 rpm for 20 hours. Thereafter, the carrier or bioreactor in the container was taken out and put through a sieve of 1 mm in aperture. The volume of the gel carrier or bioreactor remaining on the sieve was measured using a 100 ml measuring cylinder and the abrasion survival rate was obtained based on the following equation (II).

Abrasion survival rate(%)=100×Apparent volume of specimen remaining on sieve after test(ml)/30(ml)　　(II)

TABLE 3

|  | Gel forming polymer | Water absorption coefficient (%) | Abrasion survival rate (%) | Removal rate 2 weeks after waste water treatment test (%) | Removal rate 4 weeks after waste water treatment test (%) | Number of nitrification bacteria adhered per ml of carrier or bioreactor |
|---|---|---|---|---|---|---|
| Example 1 | crosslinkable N-vinylacetoamide | 2,800 | 80 | 55 | 83 | $9.5 \times 10^8$ |
| Example 2 | crosslinkable N-vinylacetoamide | 2,800 | 80 | 70 | 85 | $3.6 \times 10^9$ |
| Comparative Example 1 | polyethylene glycol | 570 | 2 or less | 53 | 77 | $1.7 \times 10^8$ |

What is claimed is:

1. A bioreactor carrier composed of a water absorption gel obtained by swelling and gelling a crosslinked N-vinylcarboxamide resin through water absorption, wherein said crosslinked N-vinylcarboxamide resin is a polymer comprising a repeating unit of the formula (A) shown below crosslinked with a crosslinking agent, and having a water absorption coefficient of 500 to 3,500% when it is swollen with water:

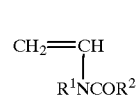

(A)

wherein $R^1$ and $R^2$ represent independently a hydrogen atom or a methyl group.

2. A carrier as claimed in claim 1, wherein the N-vinylcarboxamide is N-vinylacetoamide.

3. A carrier as claimed in claim 1, wherein the water absorption gel has a particle diameter of 1.0 to 20 mm.

4. A resin bead for forming a bioreactor carrier made from a crosslinked N-vinylcarboxamide resin which can be swollen and gelled through water absorption, wherein said crosslinked N-vinylcarboxamide resin is a polymer comprising a repeating unit of the formula (A) shown below crosslinked with a crosslinking agent, and having a water-absorption coefficient of 500 to 3,500% when it is swollen with water:

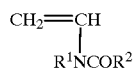 (A)

wherein $R^1$ and $R^2$ represent independently a hydrogen atom or a methyl group.

5. A resin bead as claimed in claim 4, wherein the N-vinylcarboxamide is N-vinylacetoamide.

6. A resin bead as claimed in claim 4, wherein particle diameter, when the bead is swollen with water, is 1.0 to 20 mm.

7. A bioreactor obtained by swelling and gelling a resin bead as claimed in claim 4 with a suspension of biocatalyst.

8. A bioreactor as claimed in claim 7, wherein the biocatalyst is selected from the group consisting of waste water treating biocatalysts and deodorizing biocatalysts.

* * * * *